(12) United States Patent
Frolikov

(10) Patent No.: US 10,481,818 B2
(45) Date of Patent: Nov. 19, 2019

(54) META DATA PROCESSING DURING STARTUP OF STORAGE DEVICES

(71) Applicant: Micron Technology, Inc., Boise, ID (US)

(72) Inventor: Alex Frolikov, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 35 days.

(21) Appl. No.: 15/908,407

(22) Filed: Feb. 28, 2018

(65) Prior Publication Data

US 2019/0265899 A1 Aug. 29, 2019

(51) Int. Cl.
| | | |
|---|---|---|
| G06F 3/00 | (2006.01) | |
| G06F 3/06 | (2006.01) | |
| G06F 11/07 | (2006.01) | |
| G06F 12/08 | (2016.01) | |

(52) U.S. Cl.
CPC .......... *G06F 3/0632* (2013.01); *G06F 3/0634* (2013.01); *G06F 11/0727* (2013.01); *G06F 12/08* (2013.01)

(58) Field of Classification Search
CPC .. G06F 3/0632; G06F 3/0634; G06F 11/0727; G06F 12/08; G06F 3/0611; G06F 3/0665; G06F 3/0689
See application file for complete search history.

(56) References Cited

U.S. PATENT DOCUMENTS

| | | | | |
|---|---|---|---|---|
| 8,793,290 B1 * | 7/2014 | Pruthi | ................... | G06F 3/0604 707/821 |
| 2010/0306467 A1 * | 12/2010 | Pruthi | ................... | G06F 3/0611 711/114 |
| 2014/0052691 A1 * | 2/2014 | Sasson | .................... | G06F 3/061 707/625 |
| 2015/0081966 A1 * | 3/2015 | Zheng | ................... | G06F 3/0619 711/114 |

OTHER PUBLICATIONS

"Moving metadata to Flash memory: Improve the I/O performance by effective metadata management", CloudByte Inc., Copyright 2015.
Santosh Kumar, Rajesh Vijayaraghavan, "Solid State Drive (SSD) FAQ", Oct. 2011.

* cited by examiner

*Primary Examiner* — Francisco A Grullon
(74) *Attorney, Agent, or Firm* — Greenberg Traurig, LLP

(57) ABSTRACT

A computer system having a host coupled to a storage device via a peripheral component interconnect express bus. The host communicates with the storage device in accordance with a non-volatile memory host controller interface specification. The storage device stores versions of meta data sequentially in a portion of a volatile memory that is protected against power failure using a power hold-up module. In response to a sudden power loss, the power hold-up module provides sufficient energy to support operations to copy the content from the portion of the volatile memory into a non-volatile memory. During a startup process, the content is retrieved from the non-volatile memory;

(Continued)

and a binary search is performed to locate, within the content, the latest, valid version of the meta data to continue operations interrupted by the power loss.

20 Claims, 3 Drawing Sheets

META DATA PROCESSING DURING STARTUP OF STORAGE DEVICES

FIELD OF THE TECHNOLOGY

At least some embodiments disclosed herein relate to computer storage devices in general and more particularly but not limited to solid state drives (SSDs).

BACKGROUND

Typical computer storage devices, such as hard disk drives (HDDs), solid state drives (SSDs), and hybrid drives, have controllers that receive data access requests from host computers and perform programmed computing tasks to implement the requests in ways that may be specific to the media and structure configured in the storage devices, such as rigid rotating disks coated with magnetic material in the hard disk drives, integrated circuits having memory cells in solid state drives, and both in hybrid drives.

A standardized logical device interface protocol allows a host computer to address a computer storage device in a way independent from the specific media implementation of the storage device.

For example, Non-Volatile Memory Host Controller Interface Specification (NVMHCI), also known as NVM Express (NVMe), specifies the logical device interface protocol for accessing non-volatile storage devices via a Peripheral Component Interconnect Express (PCI Express or PCIe) bus.

Sudden power loss may cause data loss in computer storage devices. To prevent data loss, a solid state drive (SSD) may be configured with a power hold-up module that provides enough power to copy data from a volatile memory to non-volatile storage media which can hold its stored data while power is disconnected from the storage device.

BRIEF DESCRIPTION OF THE DRAWINGS

The embodiments are illustrated by way of example and not limitation in the figures of the accompanying drawings in which like references indicate similar elements.

DETAILED DESCRIPTION

A computer data storage device according to some embodiments disclosed herein is configured to keep, in a volatile memory, one or more versions of meta data for the management of data in the data storage device, such as data temporarily buffered in the volatile memory and/or data stored in a non-volatile memory/storage media of the computer data storage device. The content of the volatile memory is copied into the non-volatile memory/storage media in an urgent shutdown process, e.g., in response to sudden power loss. During the subsequent startup of the storage device, the controller of the storage device performs a binary search of the latest valid version of meta data to continue the normal operations that may have been disrupted by the urgent shutdown process.

Figure 1:
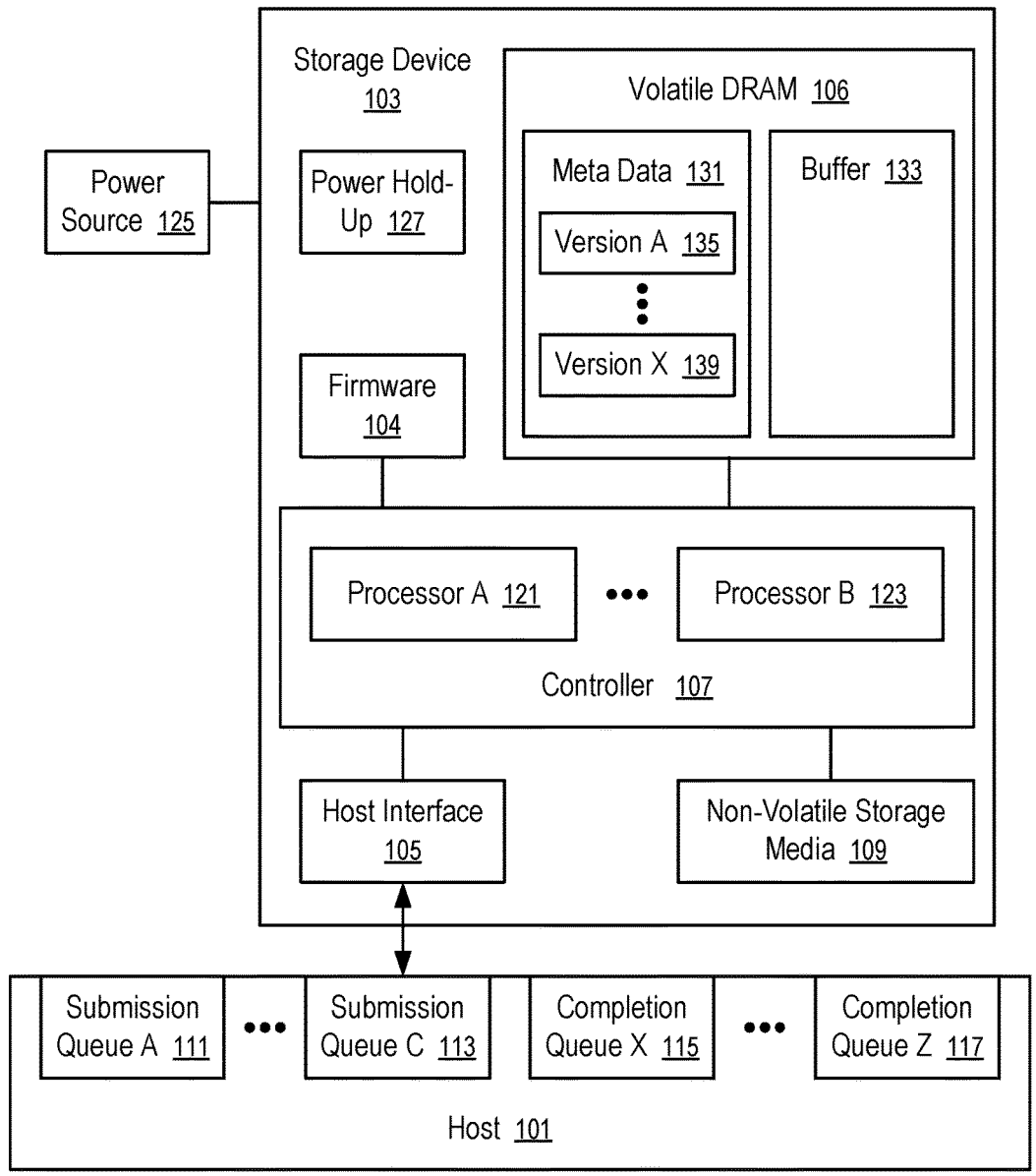
FIG. 1 shows a computer system configured to perform meta data processing during startup of a storage device according to some embodiments disclosed herein.

FIG. 1 shows a computer system configured to perform meta data processing during startup of a storage device according to some embodiments disclosed herein.

The computer system of FIG. 1 includes a host (101) and a storage device (103) that is coupled to the host (101) through a communication channel. The storage device (103) has a host interface (105) to communicate with the host (101) in accordance with a predetermined communication protocol over the communication channel. The storage device (103) receives power from a power source (125) to operate a controller (107), volatile memory (e.g., 106), and/or non-volatile memory (e.g., 109). The volatile memory (e.g., 106) requires power to retain data stored therein; and the non-volatile memory (e.g., 109) does not require power to retain data stored therein. The controller (107) is programmed via the firmware (104) to perform operations of the storage device (103).

In general, the host (101) can be a computer having one or more Central Processing Units (CPUs) to which computer peripheral devices, such as the storage device (103), may be attached via an interconnect, such as a computer bus (e.g., Peripheral Component Interconnect (PCI), PCI eXtended (PCI-X), PCI Express (PCIe)), a communication port, and/or a computer network.

In general, non-volatile storage media (109) of the storage device (103) can be implemented as memory cells in an integrated circuit, or magnetic material coated on rigid disks. The storage media (109) is non-volatile in that no power is required to maintain the data/information stored in the non-volatile storage media (109), which data/information can be retrieved after the non-volatile storage media (109) is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media (109) is non-volatile and can retain data stored therein without power for days, months, and/or years.

The storage device (103) has a volatile memory, such as a Dynamic Random-Access Memory (DRAM) (106). The volatile memory is typically used for the storage of run-time data and instructions for the controller (107) to improve the computation performance of the controller (107) and/or provide buffers (e.g., 133) for data transferred between the host (101) and the non-volatile storage media (109). DRAM (106) is volatile in that it requires power to maintain the data/information stored therein, which data/information is lost immediately or rapidly when the power to the DRAM (106) is interrupted.

Volatile DRAM (106) typically has less latency than non-volatile storage media (109), but loses its data quickly when power is removed. Thus, it is advantageous to use the volatile DRAM (106) to temporarily store instructions and data used for the controller (107) in its current computing task to improve performance. In some instances, the volatile DRAM (106) is replaced with volatile Static Random-Access Memory (SRAM) that uses less power than DRAM in some applications.

For example, volatile DRAM (106) may include a buffer (133) configured to temporarily store data, requests, and/or commands received from the host (101) before the data is committed, programmed, or written into the non-volatile storage media (109).

Volatile DRAM (106) further stores meta data (131) about the content of the buffer (133) and/or the organization of data in the storage device. In general, the meta data (131) may include data for mapping logical addresses used by the host (101) to identify storage locations in the storage device (103) and physical addresses of memory units in the non-volatile storage media (109), attributes of data stored in the storage device (103), and/or any other data that is used in the management of the storage of data in the storage device (103), such as the identifications of the content of the buffer (133).

After receiving a write command from the host (101), the storage device (103) may temporarily store the write command and its data in the buffer (133), record an updated version (139) of meta data (131) in the volatile DRAM (106) identifying the write command in the buffer (133) which command is to be committed to the non-volatile storage media (109), and then provide an acknowledgment to the host (101), signaling the completion of the write command received from the host (101). The acknowledgment can be sent before the actual completion of the operations required by the write command, to reduce the time period for the host (101) to receive the acknowledgement, because the storage device (103) is configured to guarantee the performance of the write command in view of the updated version (e.g., 139) of the meta data (131) and the content in the buffer (133). Thus, there can be a time gap between the storage device (103) acknowledging to the host (101) the completion of the write command received from the host (101) and the committing of the data of the write command into the non-volatile storage media (109).

Within the time gap, the power supply from the power source (125) may be disrupted, causing the storage device (103) to perform an urgent shutdown. The storage device (103) has a power hold-up module, which has a power storage element (e.g., a capacitor, a battery) that has sufficient energy to support the operations of the storage device (103) during the urgent shutdown process.

During the urgent shutdown process, the power supply to at least a portion of the volatile RAM (106) is maintained by the power hold-up module (127) to allow the storage device (103) to copy the content from at least the portion of the volatile DRAM (106) into a reserved section of the non-volatile storage media (109). The copied content includes the meta data (131) and the content of the buffer (133). Thus, the content of at least the portion of the volatile DRAM (106) supported by the power hold-up module (127) is protected from sudden power loss or power failure in the power source (125).

During startup, the storage device (103) loads the content, previously copied from the volatile DRAM (106) into the non-volatile storage media (109), back from the non-volatile storage media (109) to the volatile DRAM (106) to recover the previous operation state interrupted by the urgent shutdown process.

After loading the meta data (131) from the reserved section of the non-volatile storage media (109), the controller (107) of the storage device (103) searches for the latest, valid version (139) of the meta data (131). A binary search can be performed to speed up the search and thus the startup process.

For example, the latest, valid version (139) of the meta data (131) can be used to identify the write command that is in the buffer (133) and that is to be committed into a specific location in the non-volatile storage media (109) according to a logical address identified by the host (101) in the write command.

Preferably, the controller (107) is configured, via the firmware (104), to search for the latest, valid version (139) of the meta data (131) in the volatile DRAM (106) using a binary search technique discussed below.

A binary search of the last valid version of the meta data (131) can be performed when the different versions (e.g., 135, . . . , 139) of meta data (131) are sequentially stored in a predetermined section of the volatile DRAM (106). For example, the storage device (103) allocates a section of a predetermined size from the volatile DRAM (106) to store versions (135, . . . , 139) of meta data (131) sequentially. A newer version (e.g., 139) is written in the section at a position following any older versions (e.g., 135). When there is insufficient space in the section for a new version, the new version is written from the beginning of the section over the oldest version. In some instances, the section allocated for the meta data (131) is used as a circular buffer that stores the different versions of the meta data (131) sequentially. Thus, the latest, valid version follows an older version, if it exists in the circular buffer; and one or more versions following a given version are older than the given version, except when they are recorded after the latest, valid version. Such an arrangement allows the performance of a binary search as discussed below.

During the startup, the controller (107) reads the version at or near the beginning of the section configured for storing the meta data (131) and searches for a version in the middle of the section of the volatile DRAM (106).

If the version found in the middle of the section is valid and is newer than the version at the beginning of the section, it can be concluded that the latest, valid version of the meta data (131) is not in the area between the version found in the middle of the section and the beginning of the section for meta data (131). Thus, the controller (107) narrows the subsequent search to an area between the version found in the middle of the section and the end of the section for meta data (131).

If the version found in the middle of the section is valid and is older than the version at the beginning of the section, or if no valid version can be found in the middle of the section, it can be concluded that the latest, valid version of the meta data (131) is not in the area between the version found in the middle of the section and the end of the section for meta data (131). Thus, the controller (107) narrows the subsequent search to an area between the version found at the beginning of the section for meta data (131) and the version found in the middle of the section.

The process of finding a version in the middle of an area of a search to identify a subsequent area of search can be repeated until the latest, valid version of the meta data (131) is found.

The controller (107) of the storage device (103) may have multiple processors (121, . . . , 123). One of the processors (121, . . . , 123) can be configured via the firmware (104) to perform the binary search during the startup of the storage device (103) to identify the latest, valid version (139) of meta data (131).

In general, the computer storage device (103) can be used to store data for the host (101). Examples of computer storage devices in general include hard disk drives (HDDs), solid state drives (SSDs), flash memory, dynamic random-access memory, magnetic tapes, network attached storage device, etc. The host interface (105) of the storage device (103) implements communications with the host (101) using a communication channel. For example, the communication channel between the host (101) and the storage device (103) can be a PCIe bus in one embodiment; and the host (101) and the storage device (103) communicate with each other using NVMe protocol.

In some implementations, the communication channel between the host (101) and the storage device (103) includes a computer network, such as a local area network, a wireless local area network, a wireless personal area network, a cellular communications network, a broadband high-speed always-connected wireless communication connection (e.g., a current or future generation of mobile network link); and the host (101) and the storage device (103) can be configured to communicate with each other using data storage management and usage commands similar to those in NVMe protocol.

The controller (107) of the storage device (103) runs firmware (104) to perform operations responsive to the communications from the host (101). Firmware in general is a type of computer program that provides control, monitoring and data manipulation of engineered computing devices.

In some instances, when the non-volatile storage media (109) has data access performance (e.g., in latency, read/write speed) comparable to volatile DRAM (106), the volatile DRAM (106) can be eliminated; and the controller (107) can perform computing by operating on the non-volatile storage media (109) for instructions and data instead of operating on the volatile DRAM (106).

For example, cross point storage and memory devices (e.g., 3D XPoint memory) have data access performance comparable to volatile DRAM (106). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors, each having its own in-processor cache memory.

Optionally, the controller (107) performs data intensive, in-memory processing using data and/or the add-on modules (133) organized in the storage device (103). For example, in response to a request from the host (101), the controller (107) performs a real time analysis of a set of data stored in the storage device (103) and communicates a reduced data set to the host (101) as a response. For example, in some applications, the storage device (103) is connected to real time sensors to store sensor inputs; and the processors of the controller (107) are configured to perform machine learning and/or pattern recognition based on the sensor inputs to support an artificial intelligence (AI) system that is implemented at least in part via the storage device (103) and/or the host (101).

In some implementations, the processors of the controller (107) are integrated with memory (e.g., 106 or 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate, and decreases latency and power usage.

The storage device (103) can be used in various computing systems, such as a cloud computing system, an edge computing system, a fog computing system, and/or a stand-alone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

At least some embodiments of the inventions disclosed herein can be implemented using computer instructions executed by the controller (107), such as the firmware (104). In some instances, hardware circuits can be used to implement at least some of the functions of the firmware (104). The firmware (104) can be initially stored in the non-volatile storage media (109), or another non-volatile device, and loaded into the volatile DRAM (106) and/or the in-processor cache memory for execution by the controller (107).

In at least some embodiments, the host (101) and the storage device (103) communicate with each other via message queues. For example, a submission queue (e.g., 111, . . . , or 113) can be used by the host (101) to submit requests to the storage device (103); and a completion queue (115, . . . , or 117) can be used by the host (101) to receive responses from the storage device (103). For example, a version of NVMe (e.g., Non-Volatile Memory Host Controller Interface Specification 1.2) specifies the use of a circular buffer with a fixed slot size for a submission queue or a completion queue.

The NVMe further specifies different types of message queues for the processing of different types of commands. For example, input/output (I/O) commands are limited to be submitted via I/O submission queues; and admin commands are limited to be submitted via admin submission queues. Examples of I/O commands include commands to read data from the storage device (103), commands to write data into the storage device (103), commands to compare data in the storage device (103), etc. Examples of admin commands include commands to manage namespaces, commands to attach namespaces, commands to create I/O submission or completion queues, commands to delete I/O submission or completion queues, commands for firmware management, etc. The NVMe allows multiple I/O submission queues to share an I/O completion queue by explicitly identifying the I/O completion queue in the request for the creation of each of the I/O submission queues.

The NVMe requires that the controller (107) of the storage device (103) fetch the commands/requests from a submission queue according to the order in which the commands are placed in the submission queue. However, the NVMe allows the controller (107) to execute the fetched commands in any order.

For example, after the host interface (105) retrieves a write command from a submission queue (111, . . . , or 113), the storage device (103) may keep it in the buffer (133) and/or update the meta data (131) to indicate or identify the write command in the buffer (133). Instead of writing data in the non-volatile storage media (109) according to the write command immediately, the storage device (103) may schedule it for executing at a later time. The latest version of the meta data (131) can be used to identify the command(s) in the buffer (133). If a shutdown process interrupts the scheduled operations, reloading the meta data (131) and the buffer (133) from a reserved area of the non-volatile storage media (109) during the startup process allows the storage device (103) to continue at least part of the scheduled operations that have been interrupted by the shutdown process. The binary search speeds up the search of the latest, valid version of the meta data and thus the startup process following an urgent shutdown.

Figure 2:
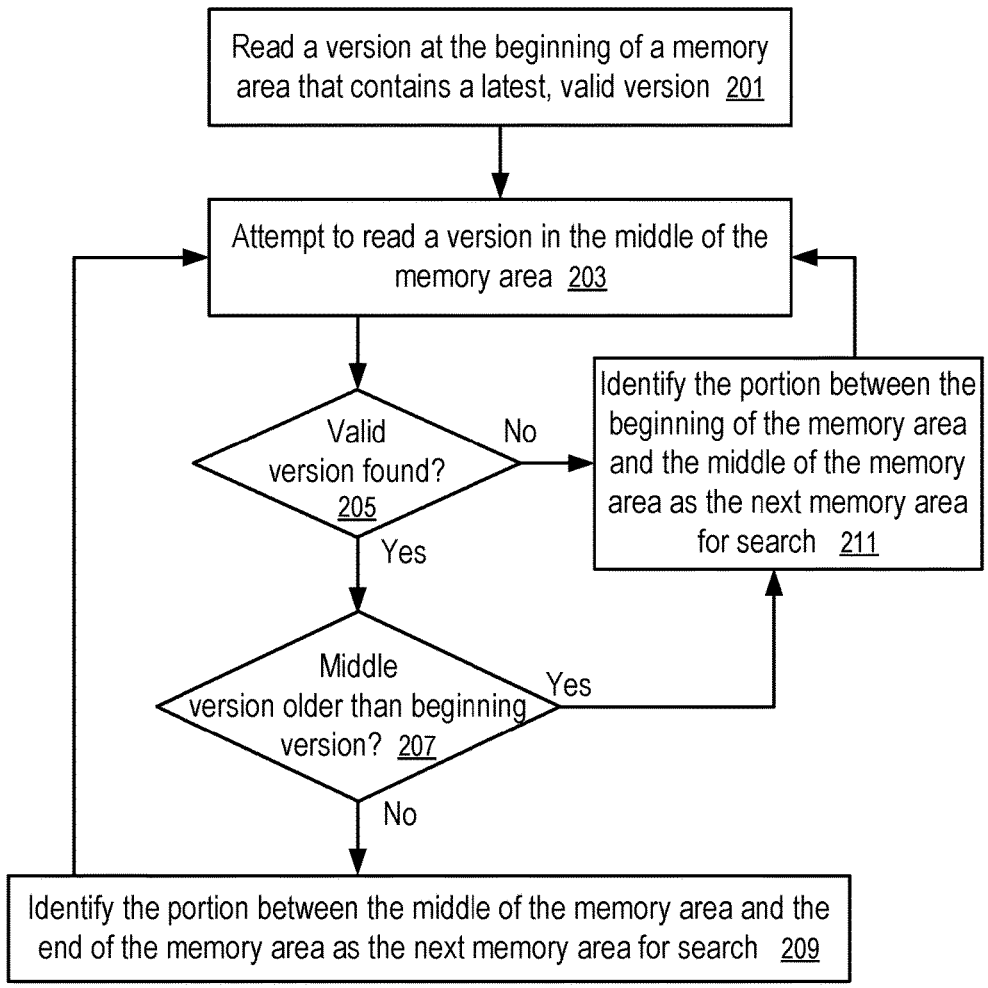
FIG. 2 shows a method to perform a binary search of the latest, valid version of meta data.

FIG. 2 shows a method to perform a binary search of the latest, valid version of meta data. For example, the method of FIG. 2 can be implemented in a computer system of FIG. 1.

The method of FIG. 2 includes: reading (201) a version (135) of meta data (131) at or near the beginning of a memory area that contains the latest, valid version; and attempting (203) to read a version of the meta data (131) in the middle of the memory area.

If it is determined (205) that a valid version is not found near the middle of the memory area, the method of FIG. 2 further includes identifying (211) the portion between the beginning of the memory area and the middle of the memory area as the next memory area for search (until the next memory area contains no other valid versions). The memory area between the beginning of the memory area and the middle of the memory area can be excluded from subsequent searches. In such a scenario, the version found at or near the beginning of the memory area may be the latest, valid version, which is to be further examined based on the result of searching the next memory area.

If it is determined (205) that a valid version is found near the middle of the memory area and it is determined (207) that the version found in the middle of the memory area is older than the version found at the beginning of the memory area, the method of FIG. 2 further includes identifying (211) the portion between the beginning of the memory area and the middle of the memory area as the next memory area for search (until the next memory area contains no other valid versions). The memory area between the beginning of the memory area and the middle of the memory area can be excluded from subsequent searches. In such a scenario, the version found at or near the beginning of the memory area may be the latest, valid version, which is to be further examined based on the result of searching the next memory area.

If it is determined (205) that a valid version is found near the middle of the memory area and it is determined (207) that the version found in the middle of the memory area is newer than the version found at the beginning of the memory area, the method of FIG. 2 further includes identifying (209) the portion between the middle of the memory area and the end of the memory area as the next memory area for search (until the next memory area contains no other valid versions). The memory area between the middle of the memory area and the end of the memory area can be excluded from subsequent searches. In such a scenario, the version found at or near the middle of the memory area may be the latest, valid version, which is to be further examined based on the result of searching the next memory area.

After the next memory area for search is identified (211 or 209), the method of FIG. 2 repeats the attempt (203) to read a version of the meta data (131) in the middle of the next memory area to further narrow down the memory area of search, until the latest, valid version is found.

Figure 3:
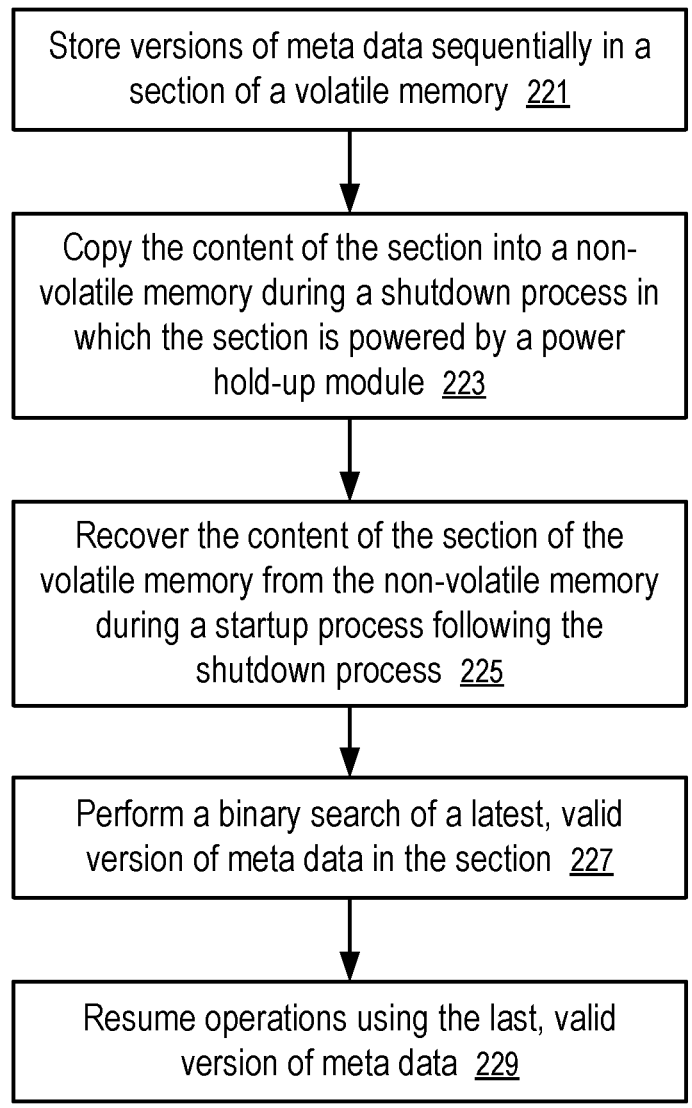
FIG. 3 shows a detailed method to process meta data.

FIG. 3 shows a detailed method to process meta data. For example, the method of FIG. 3 can be implemented in a computer system of FIG. 1 in combination with the method of FIG. 2.

The method of FIG. 3 includes: storing (221) versions (e.g., 135, 139) of meta data (131) sequentially in a section of a volatile memory (106); copying (223) the content of the section into a non-volatile memory (109) during a shutdown process in which the section is powered by a power hold-up module (127); recovering (225) the content of the section of the volatile memory (106) from the non-volatile memory (109) during a startup process that follows the shutdown process; performing (227) a binary search of a latest, valid version of meta data (131) in the section (e.g., using the method of FIG. 2); and resuming (229) operations using the last, valid version of meta data.

For example, a storage device (103) includes: a host interface (105) in communication with a host (101); a controller (107); a volatile memory (106); non-volatile storage media (109); and firmware (104) containing instructions executable by the controller (107) to perform operations of the storage device (103).

The storage device (103) stores versions (135, . . . , 139) of meta data (131) sequentially in the volatile memory (106). The age of each version (135, . . . , 139) may be identified using increasing version numbers and/or timestamps.

The meta data (131) is copied into the non-volatile storage media (109) during a shutdown process; and during a startup process following the shutdown process, the storage device (103) loads the meta data (131) from the non-volatile storage media (109) back into the volatile memory (106) and performs a binary search of a latest, valid version of the meta data (131).

For example, the shutdown process may be triggered by a sudden loss of power in the power supply (125) and a power hold-up module (127) of the storage device (103) provides and maintains power for the operations of the shutdown process in which content from one or more portions of the volatile DRAM (106) is copied to a reserved section of the non-volatile storage media (109). The copied content typically includes the meta data (131) and the content of a buffer (133) of write commands to be committed into the non-volatile storage media (109).

The power hold-up module (127) typically includes a capacitor storing energy sufficient for the shutdown process. Alternatively, the power hold-up module (127) may include a rechargeable battery to supply the power used in the shutdown process.

The storage device (103) may be a solid state drive that implements the non-volatile storage media (109) using memory units configured on solid-state chips.

In some instances, a portion of the volatile DRAM (106) for the storage of the meta data (131) is configured as a circular buffer, such that when the buffer is full, the newest version of the meta data is written over the oldest version of the meta data in the circular buffer.

In general, the binary search of the latest, valid version of the meta data (131) is performed via identifying a first area of search and searching in a middle of the first area of search for a version of the meta data (131).

In response to a determination that no valid version of the meta data (131) is found in the middle of the first area of search, a reduced second area of search is identified for the searching of the latest, valid version of the meta data (131). The second area of search is a portion of the first area search but does not include the area between the middle of the first area and the end of the first area. In such a scenario, the latest, valid version is before the middle of the first area of search.

In response to a determination that a valid version of the meta data (131) found in the middle of the first area of search is found and is older than a valid version of the meta data (131) found in the beginning of the first area of search, a reduced second area of search is identified for the subsequent search of the latest, valid version of the meta data (131). The second area of search is a portion of the first area of search but does not include the area between the middle of the first area and the end of the first area. In such a scenario, the latest, valid version is before the location of valid version found in the middle of the first area of search.

In response to a determination that a valid version of the meta data (131) found in the middle of the first area of search is found and is newer than a valid version of the meta data (131) found in the beginning of the first area, a reduced second area of search is identified for searching the latest, valid version of the meta data (131). The second area of search is a portion of the first area of search but does not include an area between the beginning of the first area and the middle of the first area. In such a scenario, the latest, valid version is on or after the location of valid version found in the middle of the first area of search.

For example, the latest, valid version of the meta data (131) identifies a write command that is buffered (133) in the volatile memory (106) and that is to be committed to the non-volatile storage media (109). The storage device may send an acknowledgment to the host (101), indicating the completion of the write command, before the write command is actually committed to the non-volatile storage media (109). When the shutdown process occurs between a time gap between the acknowledgment and committing the write command to the non-volatile storage media (e.g., in response to a sudden power loss in a power source (125) of the storage device (103)), the meta data (131) (131) and the content of the buffer (133) are copied to a reserved portion of the non-volatile storage media (109), from which the meta data (131) and the content of the buffer (133) are recovered in the startup process following the shutdown process. Thus, the identification of the latest, valid version of the meta data (131) allows the storage device (103) to identify the write command buffered in the buffer (133) and continue its operation to commit the write command to the non-volatile storage media (109).

In some instances, the storage device (103) buffers (133) a write command received from the host (105) to which the storage device (103) is attached, generates the latest, valid version of the meta data (131) to identify the write command in the buffer (133), and provides to the host (101) a response indicating a completion of the write command, before actually committing the write command to the non-volatile storage media (109).

If a shutdown process is triggered in response to a sudden power loss in a power supply (125) of the storage device (103), the storage device (103) backs up the meta data (131) and the content of the buffer (133) on to a reserved portion of the non-volatile storage media (109) for recovery during the subsequent startup.

Once the latest, valid version of the meta data (131) is found via the binary search, the storage device (103) may proceed with committing, according to the latest, valid version of the meta data (131), the write command to the non-volatile storage media (109) of the storage device (103) at a location specified by the host (101) in the write command.

In general, a binary search of the latest, valid version of meta data (131) includes: identifying an initial area of search in the volatile memory, where the initial area of search is determined to contain the latest, valid version of the meta data (131). After locating a version of the meta data (131) in a middle of the initial area of search, the location of the version of the meta data (131) located in the middle of the initial area of search divides the initial area into two portions, one of which is selected as an updated area of search. The selection is based on a result of comparing the ages of the version located in the middle of the initial area of search and the version of the meta data (131) located in the beginning of the initial area of search. If the middle version is older than the beginning version, the beginning portion (including the beginning version) is seen to contain the latest, valid version of the meta data (131); and otherwise, the ending portion (including the middle version) is seen to contain the latest, valid version of the meta data (131)

A non-transitory computer storage medium can be used to store instructions of the firmware (104) and/or the add-on modules (133). When the instructions are executed by the controller (107) of the computer storage device (103), the instructions cause the controller (107) to perform a method discussed above.

In the present disclosure, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A storage device, comprising:
   a host interface in communication with a host;
   a controller;
   a volatile memory;
   non-volatile storage media; and
   firmware containing instructions executable by the controller; and
   wherein the storage device stores versions of meta data of the storage device sequentially in the volatile memory;
   wherein the meta data is copied into the non-volatile storage media during a shutdown process; and
   wherein, during a startup process following the shutdown process, the storage device loads the meta data from the non-volatile storage media into the volatile memory and performs a binary search of a latest, valid version of the meta data.

2. The storage device of claim 1, further comprising:
   a power hold-up module that provides power during the shutdown process.

3. The storage device of claim 2, wherein the power hold-up module includes a capacitor storing energy for the shutdown process.

4. The storage device of claim 2, wherein the storage device is a solid state drive.

5. The storage device of claim 1, wherein the volatile memory includes a circular buffer; and the versions of meta data of the storage device are stored in the circular buffer.

6. The storage device of claim 1, wherein the binary search of the latest, valid version of the meta data includes searching in a middle of a first area of the volatile memory for a version of the meta data.

7. The storage device of claim 6, wherein in response to a determination that no valid version of the meta data is found in the middle of the first area of the volatile memory, a second area of the volatile memory is identified for searching the latest, valid version of the meta data, wherein the second area is a portion of the first area but does not include an area between the middle of the first area and the end of the first area.

8. The storage device of claim 6, wherein in response to a determination that a valid version of the meta data found in the middle of the first area of the volatile memory is older than a valid version of the meta data found in the beginning of the first area, a second area of the volatile memory is identified for searching the latest, valid version of the meta data, wherein the second area is a portion of the first area but does not include an area between the middle of the first area and the end of the first area.

9. The storage device of claim 6, wherein in response to a determination that a valid version of the meta data found in the middle of the first area of the volatile memory is newer than a valid version of the meta data found in the beginning of the first area, a second area of the volatile memory is identified for searching the latest, valid version of the meta data, wherein the second area is a portion of the first area but does not include an area between the beginning of the first area and the middle of the first area.

10. The storage device of claim 1, wherein the latest, valid version of the meta data identifies a write command that is buffered in the volatile memory and that is to be committed to the non-volatile storage media.

11. The storage device of claim 10, wherein the storage device sends an acknowledgment to the host for the write command before committing the write command to the non-volatile storage media.

12. The storage device of claim 10, wherein the shutdown process is between a time gap between the acknowledgment and committing the write command to the non-volatile storage media.

13. The storage device of claim 10, wherein the shutdown process is in response to a sudden power loss in a power source of the storage device.

14. A method implemented in a storage device, the method comprising:
   storing sequentially, in a volatile memory, versions of meta data of the storage device;

copying content from the volatile memory into non-volatile storage media of the storage device during a shutdown process, the content including the meta data;

loading, during a startup process following the shutdown process, the content, including the meta data, from the non-volatile storage media into the volatile memory; and performing a binary search of a latest, valid version of the meta data in the volatile memory.

15. The method of claim 14, further comprising:
buffering, in the volatile memory, a write command received from a host to which the storage device is attached;
generating the latest, valid version of the meta data to identify the write command; and
providing, to the host, a response indicating a completion of the write command, before committing the write command to the non-volatile storage media.

16. The method of claim 15, wherein the shutdown process is in response to a sudden power loss in a power supply of the storage device.

17. The method of claim 16, wherein the content includes the write content buffered in the volatile memory; and the method further comprises:
committing, according to the latest, valid version of the meta data, the write command to the non-volatile storage media of the storage device after the startup process.

18. The method of claim 17, wherein the binary search includes:
identifying an initial area of search in the volatile memory, the initial area of search containing the latest, valid version of the meta data;
locating a version of the meta data in a middle of the initial area of search, a location of the version of the meta data located in the middle of the initial area of search dividing the initial area into two portions; and
selecting one of the two portions as an updated area of search.

19. The method of claim 18, wherein the selecting is based on a result of comparing ages of the version located in the middle of the initial area of search and a version of the meta data located in the beginning of the initial area of search.

20. A non-transitory computer storage medium storing instructions which, when executed by a storage device, cause the storage device to perform a method, the method comprising:
storing sequentially, in a volatile memory, versions of meta data of the storage device;
copying the meta data into non-volatile storage media of the storage device during a shutdown process;
loading, during a startup process following the shutdown process, the meta data from the non-volatile storage media into the volatile memory; and
performing a binary search of a latest, valid version of the meta data in the volatile memory.

* * * * *